United States Patent

[11] 3,611,122

[72] Inventor Henry D. Pahl, Jr.
 99 Cross St., Belmont, Mass. 02178
[21] Appl. No. 858,578
[22] Filed Sept. 17, 1969
[45] Patented Oct. 5, 1971

[54] TESTING OF WIRE INSULATION BY CORONA DISCHARGE
 15 Claims, 3 Drawing Figs.
[52] U.S. Cl. .................................................. 324/54
[51] Int. Cl. ................................................ G01r 31/12
[50] Field of Search .......................................... 324/54, 72

[56] References Cited
 UNITED STATES PATENTS
2,965,755 12/1960 West ............................ 324/54 UX
3,134,071 5/1964 Wakefield ..................... 324/54
3,321,703 5/1967 Tystewicz ..................... 324/54

Primary Examiner—Gerard R. Strecker

ABSTRACT: In the apparatus disclosed, flaws in the insulation of a moving strand of insulated electrical wire are detected by means of a corona discharge. The discharge current is shared between the wire and an adjacent electrode so that the proportioning of the current between the electrode and the wire varies as a function of the quality of the insulation. Accordingly, a flaw in the insulation is indicated when the current picked up by the electrode falls below its normal level.

Henry D. Pahl, Jr.
INVENTOR

Henry D. Pahl Jr.
INVENTOR

TESTING OF WIRE INSULATION BY CORONA DISCHARGE

BACKGROUND OF THE INVENTION

This invention relates to apparatus for testing insulation and more particularly to apparatus for detecting flaws in the insulation of a moving strand of insulated electrical wire.

In the manufacture of magnet wire, flaws in the insulating coating are typically detected by means of mechanical contacts to which a test voltage is applied, e.g. fine conductive brushes or so-called hourglass contacts. However, since these mechanical devices depend upon physical contact with the wire, they often create new flaws in the insulation as well as detecting existing flaws.

Among the several objects of the present invention may be noted the provision of a novel apparatus for detecting flaws in the insulation of electrical wire such as magnet wire; the provision of such apparatus which does not require physical contact with the wire being tested; the provision of such apparatus which does not introduce new flaws into the insulation of the wire being tested; the provision of such apparatus which is highly reliable in the detection of flaws; and the provision of such apparatus which is relatively simple and inexpensive.

Other objects and features will be in part apparent and in part pointed out hereinafter.

SUMMARY OF THE INVENTION

Briefly, apparatus according to the present invention is adapted for detecting flaws in the insulation of a moving strand of insulated electrical wire. The apparatus employs an electrode which is supported adjacent the moving strand and means, including a high-voltage source, for producing a relatively constant current corona discharge adjacent the electrode and the adjacent portion of the moving strand. A substantial portion of the discharge current is picked up by the electrode and the strand together, with the proportioning of discharge current between the electrode and the strand being variable as a function of the quality of the insulation on the strand. The corona discharge current picked up by the electrode is sensed, e.g. by a resistor in series with the electrode discharge path, and a flaw is signalled or registered when the corona discharge current picked up by the electrode falls below a level corresponding to normal insulation quality.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
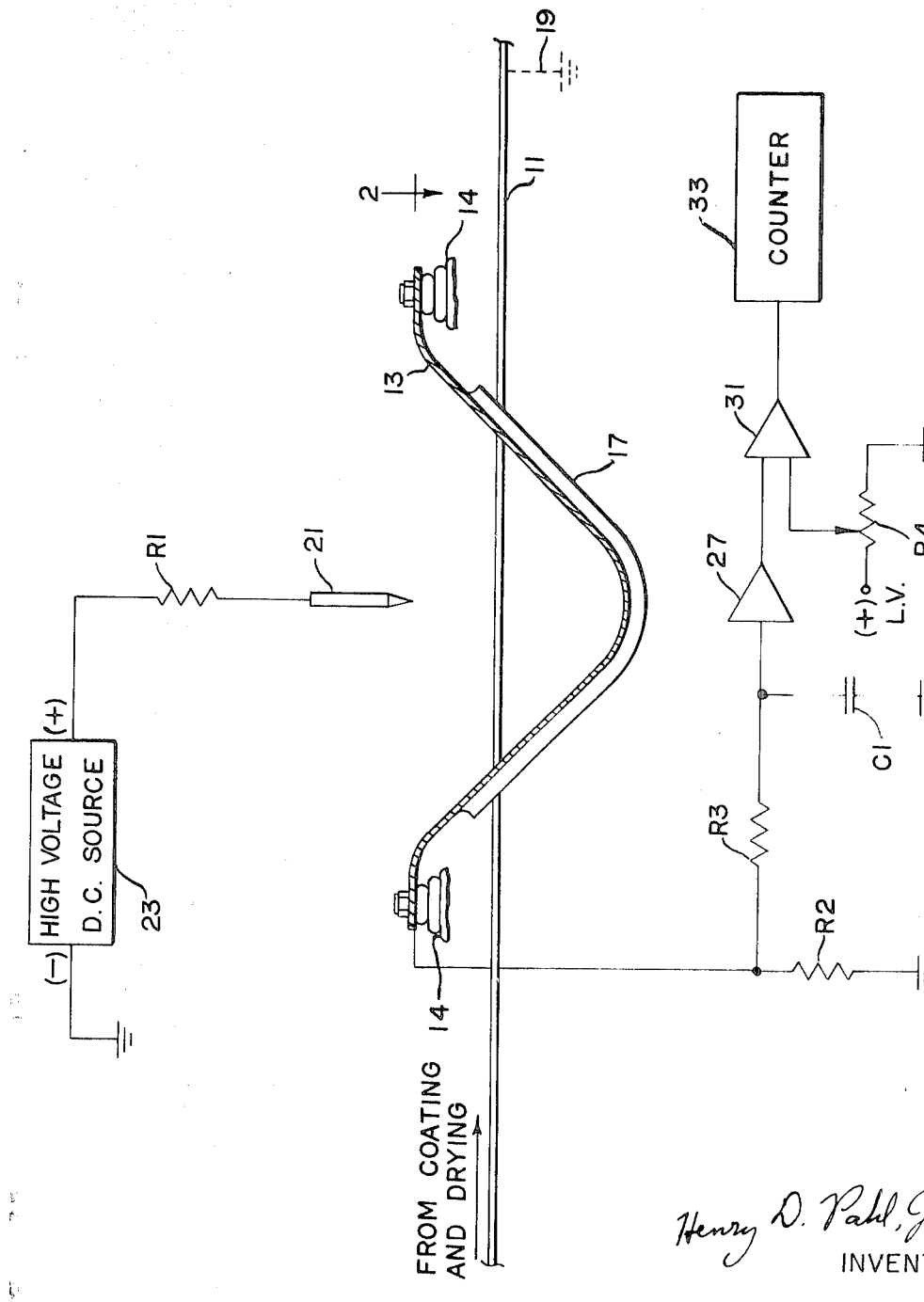
FIG. 1 is a diagrammatic illustration of flaw-detecting apparatus according to this invention.

Referring now to FIG. 1, there is indicated at 11 a moving strand of magnet wire, e.g. a solid copper wire with an insulating coating comprising one or more layers of varnish. A convenient point to perform insulation testing is just prior to coiling after the wire has been coated and dried. Thus, the strand 11 may be assumed to be somewhere along a manufacturing line, e.g. following the drying ovens and ahead of the winding area. The strand 11 is assumed to be grounded as indicated 19, e.g. through the wire source reel and the takeup reeling apparatus.

Figure 2:
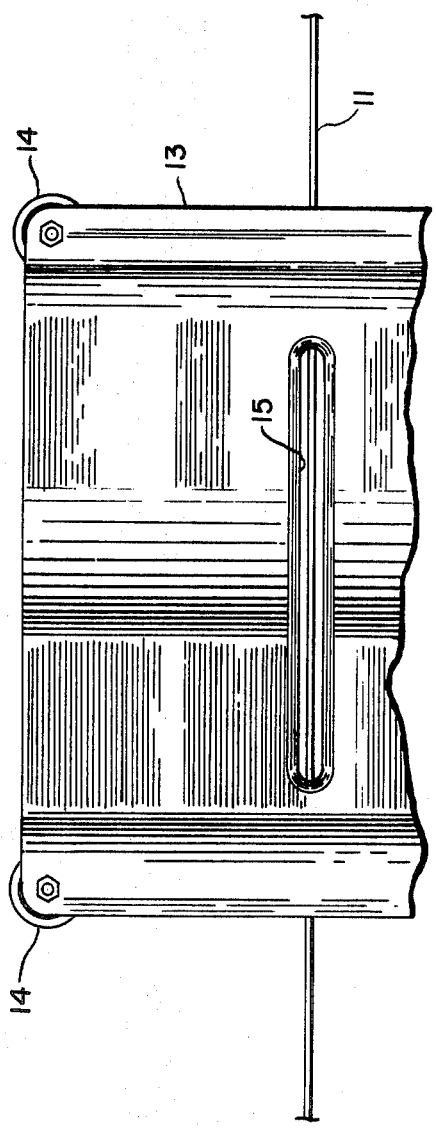
FIG. 2 is a view substantially on the line 2—2 of FIG. 1 showing an electrode employed in that apparatus.

In accordance with the present invention, an electrode 13 is supported, e.g. on suitable insulators 14, adjacent the moving wire strand 11. In order to expose only a limited portion of the strand 11 to the corona discharge described hereinafter, electrode 13 is preferably somewhat concave or dished with the strand passing through the concave portion of the electrode. As illustrated, this may be accomplished by employing a generally trough-shaped piece of sheet metal as the electrode 13, the trough being transversely slotted as indicated at 15 in FIG. 2 so that the moving strand can pass transversely through the trough. Suitable rollers may be employed to maintain the alignment of the strand with the slot and prevent contact therebetween. The edges of the slot 15 are preferably rolled downwardly as indicated at 17 in FIG. 1 so that the electrode 13 itself does not present any sharp edges to the corona discharge described hereinafter and thus abrupt field gradients are avoided.

A pointed or needlelike discharge electrode 21 is supported adjacent the electrode 13 and the exposed portion of the strand 11. A corona discharge is provided at the point of electrode 21 by means of a high-voltage DC source 23, a positive potential with respect to ground being applied to the discharge electrode 21 through a resistor R1. As is understood in the art, the pointed configuration of electrode 21 creates an abrupt field gradient adjacent the point which facilitates a corona discharge, i.e. a steady generation of ions, without sparking. As is also understood by those skilled in the art, the resistor R1 aids in producing a substantially constant current corona discharge from electrode 21.

The corona discharge current is picked up, to a variable extent, by both the electrode 13 and the strand 11. The discharge current is thus, in effect, shared between these two possible current sinks. The discharge electrode 21 is preferably supported so that it is somewhat closer to the wire strand than to the closest portions of the electrode 13 so that the discharge current would preferentially flow to the strand if it were not for the insulation on the wire.

Electrode 13 is connected to ground through a resistor R2 which provides a means for sensing the portion of the corona discharge current which is picked up by the electrode. In other words, resistor R2 provides a signal voltage which is proportional to that current. As will be understood by those skilled in the art, measuring the pick up electrode current in this way provides an indirect means of measuring the discharge current picked up by the strand 11. This connection also maintains the electrode 21 near ground potential. The signal generated across resistor R2 is applied to a low-pass filter comprising a capacitor C1 and a resistor R3 for removing relatively high-frequency electrical noise from the signal provided by electrode 13. The relative values of resistor R3 and capacitor C1 are, however, selected so that pulsating signals generated by the passage of flaws in the insulation on strand 11, as described hereinafter, are passed substantially unattenuated. If desired, low-pass filtering can instead be provided by means of a capacitor connected directly across resistor R2, the value of the capacitor being selected to provide the desired rolloff frequency in relation to the effective source impedance of the electrode in combination with the resistor R2.

As only a relatively small amount of current will typically be available from the electrode, the filtered electrode signal will typically be at relatively high impedance. An amplifier 27 is therefore employed for providing a corresponding signal at relatively low impedance. The amplified electrode signal is then applied, together with a preselectable DC reference voltage, to a comparator amplifier 31. The DC reference voltage is conveniently obtained by means of a potentiometer as indicated at R4, a fixed DC voltage being applied across the potentiometer. This latter voltage may, in fact, be the supply voltage for amplifiers 27 and 31 as will be apparent to those skilled in the art. Comparator amplifier 31 operates to energize, and thereby advance, a counter 33 whenever the amplified electrode signal falls below the DC reference voltage provided by potentiometer R4.

The operation of this apparatus is substantially as follows. When the insulation on the strand 11 is of normal quality, that is, without flaws, a majority of the substantially constant corona discharge current is picked up by the electrode 13 and thus a substantially constant voltage is generated across resistor R2. The voltage across capacitor C1 and the amplified electrode signal will therefore also be relatively constant.

Potentiometer R4 is then adjusted to provide a DC reference voltage which is slightly below the amplified electrode signal. Accordingly, in the absence of flaws, the counter 33 is not energized.

On the other hand, when a flaw in the insulation on the strand 11 passes through the electrode 13, a significant increment of the corona discharge current will be diverted to the strand 11 through the flaw in the insulation. Accordingly, the voltage developed across resistor R2 will drop momentarily. The duration of the drop will depend upon the speed of the moving strand 11 and the length of the portion thereof which is exposed to the corona discharge. In any case, however, the values of capacitor C1 and resistor R3 which comprise the low-pass filter are selected to pass such pulse signals. Assuming that the amplifier 27 does not invert the electrode signal, the amplified electrode signal applied to the comparator 31 will thus experience a negative going transient. Assuming the potentiometer R4 has been appropriately set, this transient or pulse will thus cause the energization of counter 33. It can thus be seen that the counter will register or count flaws in the insulation on the moving strand 11.

Since the apparatus illustrated registers flaws in the insulation on a moving electric wire strand without physically contacting the wire, it can be seen that the apparatus does not itself generate flaws. Further, the measuring signal is generated near ground potential thereby facilitating its handling and measurement to obtain an indication of flaws. This is to be contrasted with measuring potential changes at the discharge electrode 21.

While a counter, such as that indicated at 33, is a preferred means for registering flaws occurring in the insulation on magnet wire as it is being manufactured, it should be understood that this apparatus may be employed with other types of wire-manufacturing processes and in such environments other types of signaling, indicating or registering means may be appropriate. For example, the quality of the insulation can be registered on a meter or oscilloscope which provides a visual representation of the value of the electrode signal. Similarly, a flaw may be registered by providing an appropriate electrical signal to other control circuitry.

Figure 3:
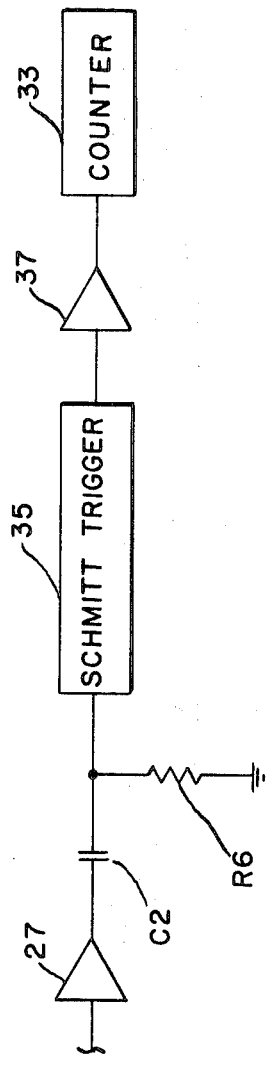
FIG. 3 is a schematic illustration of alternate circuitry which may be employed in the FIG. 1 apparatus.

As it may be desired to count flaws which are in the nature of discrete pits or voids in an insulating film without regard to the quality of the insulating film generally, it may be desirable in certain instances to AC couple the electrode signal to the registering means so that nominal DC variations, e.g. as might be caused by nominal variations in the thickness of the insulating coating, do not cause a flaw indication. In FIG. 3, the amplified electrode signal from amplifier 27 is applied, through a high pass filter comprising a capacitor C2 and a resistor R6, to a Schmitt trigger circuit 35. The relative values of capacitor C2 and resistor R6 are selected to provide a low-frequency rolloff at a point which will pass the transient or pulse generated as a discrete flaw passes through the sensing electrode 13, while blocking nominal DC variations. The transient signals are sensed and squared by the Schmitt trigger circuit 35 which in turn drives the counter 33 through a suitable power amplifier 37.

While the corona discharge will typically respond to and detect a flaw on any side of the wire strand, it should be understood that several detectors according to this invention may be used on a signal strand, the discharge electrodes being positioned on different sides of the wire.

As will be understood, the corona-producing voltage which should be applied to satisfactorily register flaws will depend upon the character, shape and spacing of the electrodes 13 and 21, as well as upon the nominal character of the insulation on the moving strand 11. For example, if it is desired to register flaws constituted by voids in only one coat of a multiply coated wire, it may be necessary to arrange the electrodes and select a source voltage which will produce a field in the vicinity of the wire which will break down the insulation if not all layers are present. Further, while the use of a DC powered corona source is preferred, a source providing unidirectional pulses may be readily used and an AC source may be used if rectification and suitable band-pass filtering of the pickup electrode signal are provided.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for detecting flaws in the insulation of a moving strand of insulated electrical wire which is substantially at ground potential, said apparatus comprising:
    an electrode;
    means for supporting said electrode adjacent said moving strand;
    means including a source providing a high voltage relative to ground for producing a relatively constant current corona discharge adjacent said electrode and the adjacent portion of said moving strand, a substantial portion of said discharge current being picked up by said electrode and said strand with the proportioning of discharge current between said electrode and said strand being variable as a function of the quality of the insulation on said strand;
    means for sensing relative to ground the corona discharge current picked up by said electrode; and
    means for registering a flaw in the insulation of said strand when the sensed corona discharge current picked up by said electrode falls below a level corresponding to a normal insulation quality.

2. Apparatus as set forth in claim 1 wherein said electrode is concave and said strand passes through the concave portion of said electrode thereby to restrict the portion of said strand which is exposed to said corona discharge.

3. Apparatus as set forth in claim 1 wherein said electrode is trough shaped and includes a slot extending transversely of the trough shape, said strand passing through the slot.

4. Apparatus as set forth in claim 3 wherein the edges of said slot are rounded away from said corona discharge producing means.

5. Apparatus as set forth in claim 1 wherein said corona discharge producing means includes a pointed discharge electrode, the point of said discharge electrode facing the current pickup electrode.

6. Apparatus as set forth in claim 5 wherein said discharge electrode is connected to said source through a resistor for maintaining the discharge current at a relatively constant level.

7. Apparatus as set forth in claim 6 wherein said source provides direct current.

8. Apparatus as set forth in claim 1 wherein said means for sensing the discharge current picked up by said electrode comprises a resistance which is in series with the path of the discharge current picked up by said electrode and which thereby provides an electrode signal which is a function of the level of current picked up.

9. Apparatus as set forth in claim 8 wherein said strand is grounded and said resistor connects said electrode to ground.

10. Apparatus as set forth in claim 8 including means for filtering relatively high-frequency noise components from said electrode signal.

11. Apparatus as set forth in claim 8 including means for comparing said electrode signal with a preselectable voltage.

12. Apparatus as set forth in claim 11 wherein said means for registering a flaw comprises a counter and wherein said comparing means actuates said counter when the electrode signal falls below said preselected voltage.

13. Apparatus as set forth in claim 8 including means for blocking the DC component of said electrode signal.

14. Apparatus as set forth in claim 13 including a counter and means for actuating said counter when the AC component of said electrode signal exceeds a predetermined level.

15. The method of detecting flaws in the insulation of a moving strand of insulated electrical wire which is substantially at ground potential, said method comprising:

supporting an electrode adjacent said moving strand;

producing, at a high voltage relative to ground, an essentially constant current electric discharge adjacent said electrode and the adjacent portion of said moving strand, a substantial portion of said discharge current being picked up by said electrode and said strand with the proportioning of discharge current between said electrode and said strand being variable as a function of the quality of the insulation on said strand;

sensing relative to ground the discharge current picked up by said electrode; and registering a flaw in the insulation of said strand when the sensed discharge current picked up by said electrode falls below a level corresponding to a normal insulation quality.